(12) United States Patent
Froeschl

(10) Patent No.: US 9,500,160 B2
(45) Date of Patent: Nov. 22, 2016

(54) MOTOR ASSEMBLY

(71) Applicant: Bayerische Motoren Werke Aktiengesellschaft, Munich (DE)

(72) Inventor: Joachim Froeschl, Herrsching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/846,585

(22) Filed: Sep. 4, 2015

(65) Prior Publication Data
US 2015/0377181 A1 Dec. 31, 2015

Related U.S. Application Data

(63) Continuation of application No. PCT/EP2014/052186, filed on Feb. 5, 2014.

(30) Foreign Application Priority Data

Mar. 5, 2013 (DE) .................. 10 2013 203 683

(51) Int. Cl.
| | |
|---|---|
| *F01B 29/08* | (2006.01) |
| *F02G 5/04* | (2006.01) |
| *F02G 1/043* | (2006.01) |
| *F02G 1/044* | (2006.01) |
| *F02G 5/02* | (2006.01) |

(Continued)

(52) U.S. Cl.
CPC ............... *F02G 5/04* (2013.01); *F01N 3/0205* (2013.01); *F02G 1/043* (2013.01); *F02G 1/044* (2013.01); *F02G 1/0435* (2013.01); *F02G 1/055* (2013.01); *F02G 5/02* (2013.01); *Y02T 10/166* (2013.01)

(58) Field of Classification Search
USPC .................. 60/516–526, 682; 62/6, 324.2
See application file for complete search history.

(56) References Cited

U.S. PATENT DOCUMENTS 3,698,182 A * 10/1972 Knoos ..................... F02G 1/044
60/522
7,634,988 B1 * 12/2009 Salminen .................. F01B 7/18
123/253

(Continued)

FOREIGN PATENT DOCUMENTS

| DE | 10 2009 020 417 A1 | 11/2010 |
|---|---|---|
| DE | 10 2011 109 147 A1 | 2/2012 |

(Continued)

OTHER PUBLICATIONS

International Search Report dated May 16, 2014 (Two (2) pages).

(Continued)

*Primary Examiner* — Binh Q Tran
(74) *Attorney, Agent, or Firm* — Crowell & Moring LLP

(57) ABSTRACT

A motor assembly for a motor vehicle includes an internal combustion engine that has an exhaust gas purification device and a heat engine. The heat engine has at least one closed working space that is filled with a gas. The at least one closed working space includes first and second cylinders, which are each movably mounted in the longitudinal direction between initial and expansion positions. The heat engine includes at least one heating unit for heating the gas in at least one heating region of the closed working space and at least one cooling unit for cooling the gas in at least one cooling region of the closed working space. The gas heated in the heating region pushes the first piston from its initial position into its expansion position, and then flows through the overflow line into the cooling region such that the second piston is then pushed into its expansion position. The overflow line leads at least in sections through the exhaust gas purification device.

14 Claims, 3 Drawing Sheets

(51) Int. Cl.
*F01N 3/02* (2006.01)
*F02G 1/055* (2006.01)

(56) References Cited

U.S. PATENT DOCUMENTS

| | | | |
|---|---|---|---|
| 7,984,684 B2* | 7/2011 | Hinderks | B63B 1/28 |
| | | | 114/274 |
| 8,181,460 B2* | 5/2012 | McQuary | F25B 9/14 |
| | | | 60/516 |
| 8,726,661 B2 | 5/2014 | Spicer et al. | |
| 9,046,055 B2* | 6/2015 | Mikalsen | F02G 1/02 |

FOREIGN PATENT DOCUMENTS

| | | |
|---|---|---|
| JP | 2002-266701 A | 9/2002 |
| JP | 2004-36499 A | 2/2004 |
| JP | 2009-167822 A | 7/2009 |

OTHER PUBLICATIONS

German Search Report dated Sep. 20, 2013, with Statement of Relevancy (Six (6) pages).

* cited by examiner

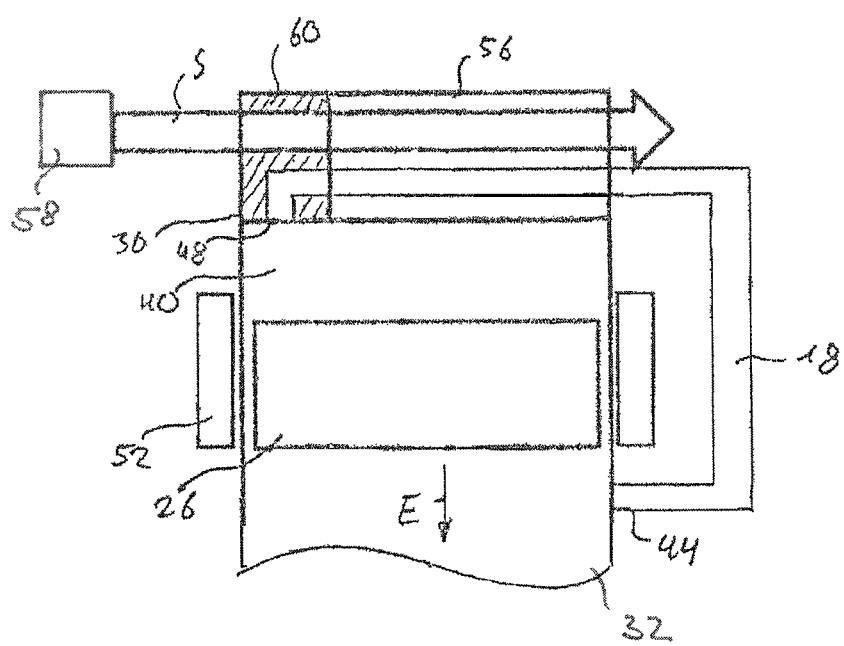

MOTOR ASSEMBLY

CROSS REFERENCE TO RELATED APPLICATIONS

This application is a continuation of PCT International Application No. PCT/EP2014/052186, filed Feb. 5, 2014, which claims priority under 35 U.S.C. §119 from German Patent Application No. 10 2013 203 683.3, filed Mar. 5, 2013, the entire disclosures of which are herein expressly incorporated by reference.

BACKGROUND AND SUMMARY OF THE INVENTION

The heat generated in internal combustion engines for vehicles is utilized in part to heat, by way of the hot exhaust gas, an exhaust-gas purification apparatus to an operating temperature required for the operation of the exhaust-gas purification apparatus. With progressive operating duration and increasing operating intensity, that is to say high power output of the internal combustion engine, the exhaust-gas purification apparatus is however heated further, such that, above a defined temperature, cooling of the exhaust-gas purification apparatus is necessary. Owing to the high temperatures, however, cooling is not possible by means of a simple cooling circuit which contains a coolant or water vapor, for example because coolants are not designed for such high temperatures.

It is an object of the invention to provide an engine assembly which permits effective cooling of the exhaust-gas purification apparatus and improved utilization of the heat generated by the engine.

To achieve the object, it is provided, in the case of an engine assembly of the type mentioned in the introduction, that the flow transfer line is led at least in sections through the exhaust-gas purification apparatus, wherein an exchange of heat takes place between the exhaust-gas purification apparatus and the gas flowing in the flow transfer line. The heat engine functions on the basis of the principle of a Stirling engine, wherein, during a movement of the at least one piston, the gas flows through the flow transfer line between the heating region and the cooling region. The flow transfer line that is led through the exhaust-gas purification apparatus functions, in effect, as a heat exchanger. The gas flowing through the flow transfer line can thus absorb heat from the exhaust-gas purification apparatus or release heat to the latter. Upon starting of the internal combustion engine, it is thus possible for the exhaust-gas purification apparatus to be heated up more quickly, for example by way of a release of heat, such that said exhaust-gas purification apparatus reaches its operating temperature more quickly. When the exhaust-gas purification apparatus has reached its operating temperature, the gas can absorb excess heat and conduct it away from the exhaust-gas purification apparatus, that is to say cool the exhaust-gas purification apparatus and thus prevent or at least delay an increase in temperature of the exhaust-gas purification apparatus. This type of cooling by means of a Stirling engine offers the advantage that a heat engine of said type can be operated even at very high temperatures.

The heating device for the heat engine or the first end section of the working chamber for the heat engine may be formed for example by the internal combustion engine and/or the exhaust-gas purification apparatus. The heat of the internal combustion engine and/or of the exhaust-gas purification apparatus can thus be utilized in an effective manner, and no additional energy source for the heat engine is required. Energy-saving cooling of the exhaust-gas purification apparatus is thus realized.

The flow transfer line may for example branch within the exhaust-gas purification apparatus into multiple sub-lines, such that, owing to the larger surface area between the exhaust-gas purification apparatus and flow transfer line, a significantly improved exchange of heat is possible between the exhaust-gas purification apparatus and the gas flowing through the flow transfer line.

The flow transfer line or the sub-lines may be led through the exhaust-gas purification apparatus in any desired manner in order to realize the best possible exchange of heat between the flow transfer line or sub-lines and exhaust-gas purification apparatus. The flow transfer line or the sub-lines are preferably led through the exhaust-gas purification apparatus in a flow direction, such that an exchange of heat is possible over as great a distance as possible.

The gas may for example flow from the heating region into the cooling region through the flow transfer line in the flow direction of the exhaust-gas purification apparatus.

It is however also conceivable for the gas to flow from the heating region into the cooling region through the flow transfer line counter to the flow direction of the exhaust-gas purification apparatus, whereby an improved exchange of heat or an improved dissipation of heat from the exhaust-gas purification apparatus is possible.

It is however optionally also conceivable for the flow transfer line or sub-lines of the flow transfer line to be led through the exhaust-gas purification apparatus substantially transversely with respect to the flow direction of the exhaust-gas purification apparatus.

In a first embodiment, the heating device is assigned to the first cylinder and the cooling device is assigned to the second cylinder. The heating region is provided in the first cylinder, and the cooling region is provided in the second cylinder. This construction corresponds to a conventional Stirling engine with a working piston and a displacement piston, wherein, depending on the construction of the Stirling engine, the first or the second piston constitutes the working piston, and the respective other piston constitutes the displacement piston.

The first and/or the second piston are/is for example of magnetic form, and an electrical coil is provided which circumferentially surrounds the first and/or the second cylinder between the initial position and expansion position. When the piston moves in the working chamber, this causes an electrical induction current to be generated in the coil, such that electrical current can be generated by way of the mechanical work of the piston.

In a second embodiment, a first heating region, a first cooling region and a first flow transfer line which connects the first heating region and the first cooling region to one another in terms of flow are provided on the first cylinder, and a second heating region, a second cooling region and a second flow transfer line which connects the second heating region and the second cooling region to one another in terms of flow are provided on the second cylinder, wherein the flow transfer lines are each arranged such that a connection in terms of flow is produced between the heating region and the cooling region only in the expansion position of the pistons. In particular, the first and the second cylinder are arranged one behind the other in the longitudinal direction, and by the cooling regions or the heating regions are adjacent to one another. In this embodiment, in effect, two Stirling engines are integrated into one another, wherein the working piston and the displacement piston of the first Stirling engine form the displacement piston and the working piston of the second Stirling engine. This construction offers the advantage that only one common cooling device or heating device is required for the mutually adjacent cooling regions or heating regions, whereby improved utilization of the cooling power or heating power is possible. In this embodiment, the first cylinder together with the first flow transfer line form a first, closed working chamber, and the second cylinder together with the second flow transfer line form a second working chamber which is separate from the first working chamber.

In this embodiment, too, the pistons may be of magnetic form. On at least one cylinder, there is provided an electrical coil which circumferentially surrounds the first and/or the second cylinder between the initial position and expansion position. In this embodiment, the pistons may additionally be oriented such that the magnetic fields of the pistons repel one another. This additionally offers the advantage that the pistons are coupled by way of the magnetic fields, such that one of the pistons, which is moved toward the connecting region of the two cylinders, repels the respective other piston.

Further advantages and features will emerge from the following description in conjunction with the appended drawings, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 shows a fourth embodiment of an engine assembly according to the invention.

DETAILED DESCRIPTION OF THE DRAWINGS

Figure 1:
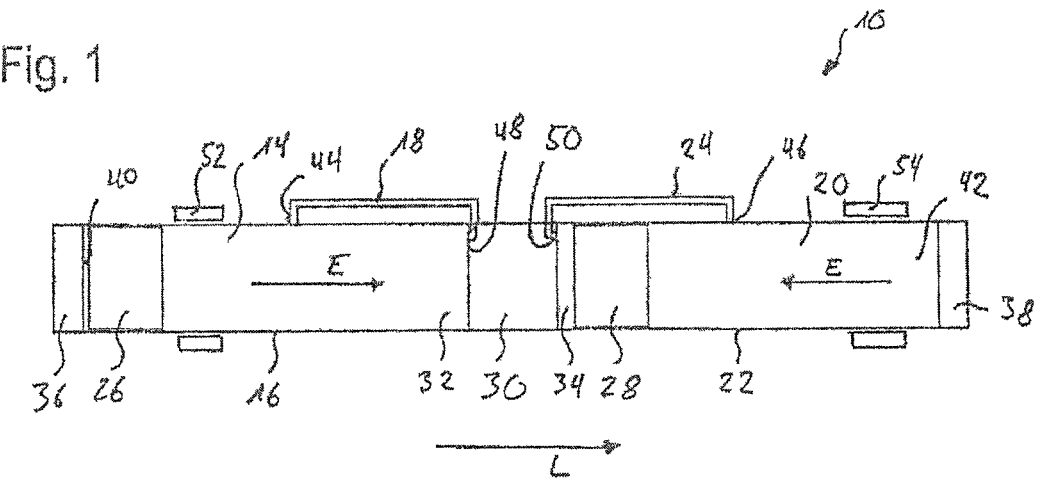
FIG. 1 shows a heat engine of an engine assembly according to the invention.
Figure 2:
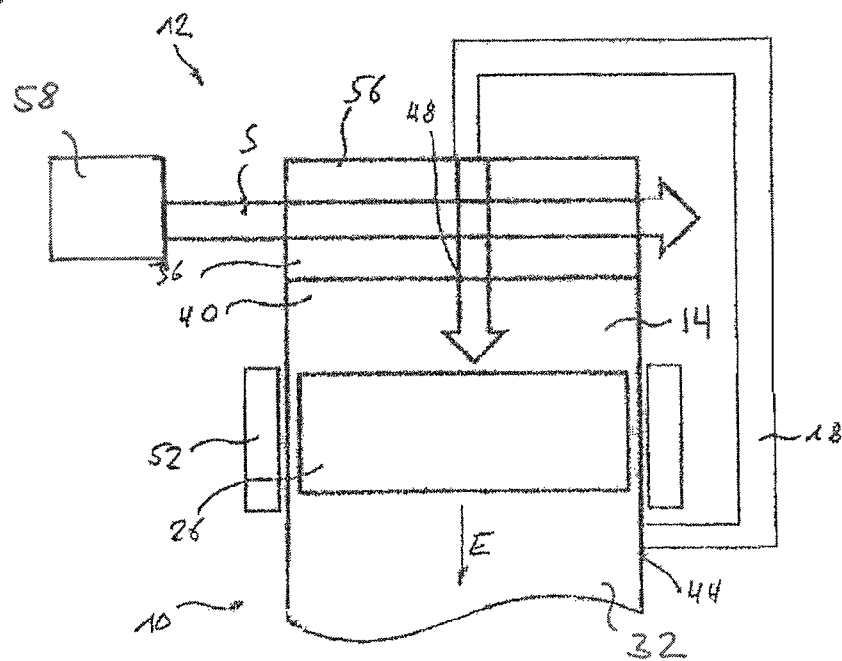
FIG. 2 shows a first embodiment of an engine assembly according to the invention.

FIG. 1 shows a heat engine 10 for an engine assembly 12 shown in FIG. 2, which functions on the basis of the principle of a Stirling engine.

The heat engine 10 has a first closed-off, gas-filled working chamber 14, which is formed by a first cylinder 16 and a first flow transfer line 18, and a second closed-off, gas-filled working chamber 20, which is formed by a second cylinder 22 and a second flow transfer line 24. The cylinders 16, 22 are arranged one behind the other, and so as to be directly adjacent to one another, in the longitudinal direction L.

A first piston 26 is mounted so as to be movable in the longitudinal direction in the first cylinder 16, and a second piston 28 is mounted so as to be movable in the longitudinal direction in the second cylinder 22.

Between the cylinders 16, 22 there is provided a common cooling device 30 which can cool the gas in the working chambers 14, 20 in each case in a cooling region 32, 34. At the opposite ends of the cylinders 16, 22 there is provided in each case a heating device 36, 38 which can heat the gas in each case in a heating region 40, 42.

The pistons 26, 28 can each be moved in an expansion direction E from an initial position at the mutually remote ends of the cylinders 16, 22 or in the heating regions 40, 42 into an expansion position in the middle or in the direction of the opposite cooling regions 32, 34. The two pistons 18, 20 are magnetic and are designed such that the magnetic fields of the pistons 26, 28 repel one another.

The flow transfer lines 18, 24 each issue by way of a first end 44, 46 into the cylinders 16, 22 approximately in the middle of said cylinders. The second ends 48, 50 issue in each case into the cooling regions 32, 34 of the cylinders 16, 22.

On both cylinders 16, 22, in the region between the initial position and the expansion position of the pistons 26, 28, there is provided in each case an electrical coil 52, 54 which circumferentially surrounds the respective cylinder 16, 22.

The heat engine 10 operates on the basis of the principle of a Stirling engine.

In FIG. 1, the first piston 26 is situated in the initial position, and the second piston 28 is situated in the expansion position.

The first heating device 36 causes the gas in the first heating region 40 of the first cylinder 16 to be heated and expand. The first cooling device 30 simultaneously cools the gas in the first cooling region 32, which reduces its volume owing to the reduction in temperature. Owing to the increasing pressure in the first heating region 40 and the reduced pressure in the first cooling region, the first piston 26 is moved in the expansion direction E.

When the first piston 26 has passed the first end 44 of the first flow transfer line 18 and the first piston has arrived in the expansion position, a connection in terms of flow is produced between the heating region 40 and the cooling region 32. Owing to the relatively high pressure in the heating region 40, the gas flows from the first heating region 40 into the first cooling region 32, until pressure equilibrium has been established between said regions.

When the first piston 26 is in the initial position, the second piston 28 is situated in the expansion position, in which pressure equalization between the second cooling region 34 and the second heating region 42 is possible via the second flow duct.

When the first piston 26 is displaced into the expansion position owing to the increasing pressure in the first heating region 40, the second piston is, owing to the mutually repellent magnetic fields of the two pistons 26, 28, displaced counter to the expansion direction E from the expansion position into the initial position.

When the second piston 28 is moved from the expansion position into the initial position, it is displaced in front of the first end 50 of the second flow transfer line 24 and past the latter, such that no pressure equalization between the second cooling region 34 and the second heating region 42 is possible.

The magnetic fields of the pistons 26, 28 are configured such that, during a movement of the first piston 26 into the expansion position, the second piston 28 is displaced as far as into the initial position.

When the second piston 28 has arrived in the initial position, the gas in the second heating region 42 is heated, whereby it expands. At the same time, the gas in the second cooling region 34 is cooled, and decreases in volume. Owing to the increasing pressure in the second heating region 40 and the reduced pressure in the second cooling region 34, the second piston 26 is displaced back in the expansion direction again. Since the pistons 26, 28 repel one another, this causes the first piston to be displaced back into the initial position.

The heating of the heating regions 40, 42 and the cooling of the cooling regions 32, 34 give rise, in combination with the coupling of the pistons 26, 28, which in this embodiment is realized by way of the magnetic fields of the pistons 26, 28, to an oscillating movement of the pistons 26, 28.

Since the pistons 26, 28 are of magnetic form, this movement causes an electrical induction current to be generated in the electrical coils 52, 54, which electrical induction current can be utilized for various consumers in the vehicle. Furthermore, the movement of the pistons 26, 28 can be initiated by the application of a voltage to one of the coils 52, 54.

The gas flowing through the flow transfer lines 18, 24 can furthermore be utilized for regulating the temperature of an exhaust-gas purification apparatus 56 of an internal combustion engine 58 of the engine assembly 12 shown in FIG. 2.

For clarity, FIG. 2 shows only the first working chamber 14 of the heat engine 10. In the embodiment shown here, the flow transfer line 18 runs through the exhaust-gas purification device 56 transversely with respect to the flow direction S of said exhaust-gas purification device. The second flow transfer line 24 (see FIG. 1) may also be led through the exhaust-gas purification system 56.

Furthermore, in this embodiment, the heating device 36 of the heat engine 10 is formed by the exhaust-gas purification apparatus 56.

Within the exhaust-gas purification apparatus 56, the flow transfer line 18 may branch into multiple sub-lines, wherein the diameter of the sub-lines may be reduced in relation to that of the flow transfer line 18.

During normal operation of the internal combustion engine 58, very high temperatures are generated in the exhaust-gas purification apparatus 56 by the exhaust gas flowing out of the internal combustion engine 58, which very high temperatures are required inter alia for the functioning of the exhaust-gas purification apparatus 56. Said heat can also be utilized for the heat engine 10. The heating devices 36, 38 are thus formed by the exhaust-gas purification system 56. Thus, no additional heating device is required.

The flow transfer line 18 is laid through the exhaust-gas purification apparatus 56 such that the gas, flowing through the flow transfer line 18, of the heat engine 10 can absorb and dissipate the heat generated at the exhaust-gas purification apparatus 56.

The advantage of this arrangement lies in the fact that, in the presence of very high temperatures of the exhaust-gas purification apparatus 56, which could lead to ineffective exhaust-gas purification or to damage of the exhaust-gas purification apparatus 56, it is possible by means of the heat engine 10 and the flow transfer line 18 to realize temperature regulation, in particular cooling or a dissipation of heat from the exhaust-gas purification apparatus 56 by way of the transfer of heat to the gas flowing through.

Since a heat engine 10 can be operated with very high temperatures, a very much more effective dissipation of heat from the exhaust-gas purification apparatus 56 is possible than would be possible using water vapor or other coolants, for example.

Since the heating device 30 is formed by the exhaust-gas purification apparatus 56, it is furthermore the case that no additional energy source for the heat engine 10 is required.

In this way, the heat that is generated at the exhaust-gas purification apparatus 56 can additionally be utilized to generate electrical current by way of the heat engine 10 or the coils 52, 54 and the magnetic pistons 26, 28, which electrical current can be utilized for various consumers in the vehicle.

The flow transfer lines 18, 24 may be led through the exhaust-gas purification apparatus 56 in any desired manner in accordance with the desired cooling power or heat-exchange power.

Figure 3:
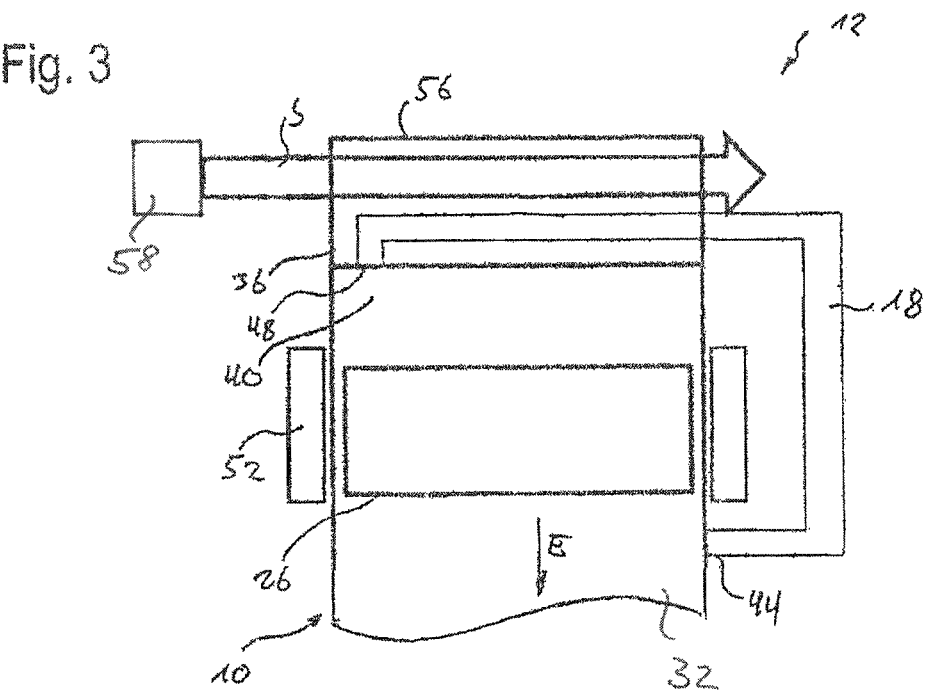
FIG. 3 shows a second embodiment of an engine assembly according to the invention.

A second embodiment of an engine assembly 12 according to the invention is shown in FIG. 3. The construction of said engine assembly 12 substantially corresponds to the engine assembly 12 shown in FIG. 2. However, in this case, the flow transfer line 18 is laid not transversely with respect to the flow direction S of the exhaust-gas purification apparatus 56 but in the flow direction S of the exhaust-gas purification apparatus 56, wherein the gas flows from the first cooling region 32 into the first heating region 40 in the flow direction S. Since the gas thus covers a greater distance within the exhaust-gas purification apparatus 56, it is possible for the gas to absorb a significantly greater amount of heat, such that a significantly more effective exchange of heat is possible.

Figure 4:
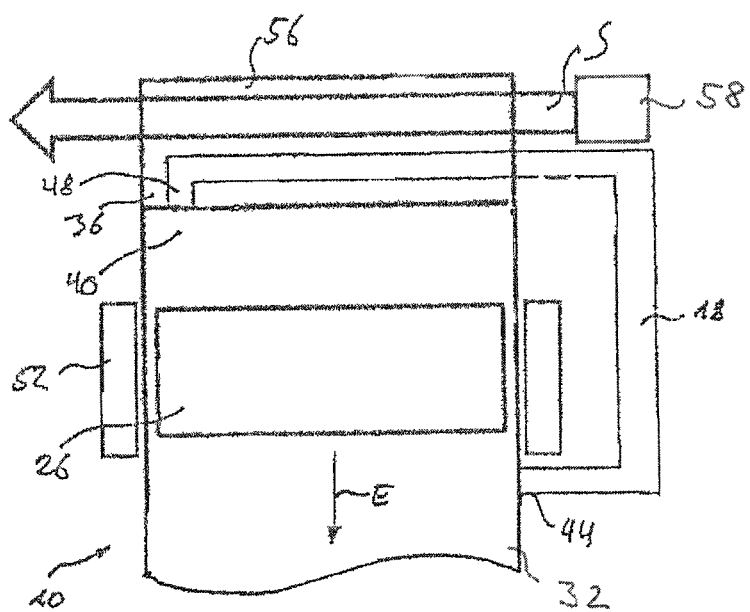
FIG. 4 shows a third embodiment of an engine assembly according to the invention.

The embodiment shown in FIG. 4 substantially corresponds to the embodiment shown in FIG. 3, wherein the gas flows in the opposite direction from the first cooling region 32 into the first heating region 40, that is to say counter to the flow direction S.

A fourth embodiment is shown in FIG. 5, wherein, in this embodiment, an additional heat exchanger 60 is provided upstream of the exhaust-gas purification apparatus 56 as viewed in the flow direction S, and the flow transfer line 18 is also led through the heat exchanger 60.

Regardless of the embodiment of the heat engine or of the Stirling engine, it is provided in each case that the flow transfer line 18, 24 runs through the exhaust-gas purification apparatus 56, such that an exchange of heat is possible between the exhaust-gas purification apparatus 56 and the gas flowing in the flow transfer line 18.

In the embodiment shown, the pistons 26, 28 each perform a dual function as drive piston and displacement piston of a Stirling engine. It is however also conceivable for the heat engine 10 to have a simpler construction with only one heating device 36, 38 and one cooling device 30. In such an embodiment, the heating device 36 is assigned to one piston 26, 28, and the cooling device 30 is assigned to the respective other piston 26, 28. The flow transfer duct connects the two cylinders 16, 22, or the heating region and the cooling region which are each arranged in one of the cylinders 16, 22, such that the heat engine has only one working chamber 14, 20. In such an embodiment, the pistons may also be mechanically coupled to one another independently of a coil 52, 54.

The engine assembly may thus have any desired heat engine 10 which operates on the basis of the principle of a Stirling engine and which has at least one flow transfer duct 18, 24 which is led through the exhaust-gas purification apparatus 56.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An engine assembly for a vehicle having an internal combustion engine which has an exhaust-gas purification apparatus, the engine assembly having a heat engine comprising:
 at least one closed-off working chamber which is filled with a gas, the at least one closed-off working chamber includes a first cylinder in which a first piston is mounted so as to be movable in a longitudinal direction between a first initial position and a first expansion position, wherein the at least one closed-off working chamber further includes a second cylinder in which a second piston is mounted so as to be movable in the longitudinal direction between a second initial position and a second expansion position,
 at least one heating device for heating the gas in at least one heating region of the at least one closed-off working chamber,
 at least one cooling device for cooling the gas in at least one cooling region of the at least one closed-off working chamber, and
 at least one flow transfer line which connects the at least one heating region and the at least one cooling region in terms of gas flow, wherein the at least one flow transfer line is configured such that gas that is heated in the at least one heating region can displace the first piston from the first initial position into the first expansion position, and wherein said gas can then subsequently flow through the flow transfer line into the cooling region and displace the second piston into the second expansion position,
 wherein the first piston and the second piston are coupled such that the second piston is moved from the second initial position into the second expansion position in temporally offset fashion with respect to the first piston, and such that, during a movement of the second piston from the second initial position into the second expansion position, the first piston is moved in the direction of the first initial position, and
 wherein the flow transfer line is led at least in sections through the exhaust-gas purification apparatus such that an exchange of heat takes place between the exhaust-gas purification apparatus and the gas flowing in the flow transfer line.

2. The engine assembly as claimed in claim 1, wherein at least one of the internal combustion engine and the exhaust-gas purification apparatus forms the heating device.

3. The engine assembly as claimed in claim 1, wherein the flow transfer line branches within the exhaust-gas purification apparatus into multiple sub-lines.

4. The engine assembly as claimed in claim 2, wherein the flow transfer line branches within the exhaust-gas purification apparatus into multiple sub-lines.

5. The engine assembly as claimed in claim 3, wherein one of the flow transfer line and multiple sub-lines lead through the exhaust-gas purification apparatus in a flow direction.

6. The engine assembly as claimed in claim 4, wherein one of the flow transfer line and the multiple sub-lines lead through the exhaust-gas purification apparatus in a flow direction.

7. The engine assembly as claimed in claim 5, wherein the gas flows from the heating region into the cooling region through the flow transfer line in the flow direction of the exhaust-gas purification apparatus.

8. The engine assembly as claimed in claim 5, wherein the gas flows from the heating region into the cooling region through the flow transfer line counter to the flow direction of the exhaust-gas purification apparatus.

9. The engine assembly as claimed in claim 3, wherein one of the flow transfer line and multiple sub-lines lead through the exhaust-gas purification apparatus transversely with respect to the flow direction of the exhaust-gas purification apparatus.

10. The engine assembly as claimed in claim 4, wherein one of the flow transfer line and multiple sub-lines lead through the exhaust-gas purification apparatus transversely with respect to the flow direction of the exhaust-gas purification apparatus.

11. The engine assembly as claimed in claim 1, wherein the heating device is assigned to the first cylinder and the cooling device is assigned to the second cylinder, and the heating region is provided in the first cylinder and the cooling region is provided in the second cylinder.

12. The engine assembly as claimed in claim 1, wherein a first heating region, a first cooling region and a first flow transfer line which connects the first heating region and the first cooling region to one another in terms of flow are provided on the first cylinder, and a second heating region, a second cooling region and a second flow transfer line which connects the second heating region and the second cooling region to one another in terms of flow are provided on the second cylinder, wherein the first and second flow transfer lines are each arranged such that a connection in terms of flow is produced between the respective heating regions and the respective cooling regions only in the respective expansion position of the first and second pistons, and wherein the first and the second cylinders are arranged one behind the other in the longitudinal direction, such that one of the respective cooling regions or respective heating regions are adjacent to one another.

13. The engine assembly as claimed in claim 1, wherein the first and second pistons are magnetic and, on at least one of the first and second cylinders, an electrical coil is provided which circumferentially surrounds the at least one of the first and second cylinder between respective initial and expansion positions.

14. The engine assembly as claimed in claim 12, wherein the first and second pistons are magnetic and, on at least one of the first and second cylinders, an electrical coil is provided which circumferentially surrounds the at least one of the first and second cylinder between respective initial and expansion positions.

* * * * *